United States Patent
Cromer et al.

(10) Patent No.: US 8,068,305 B2
(45) Date of Patent: *Nov. 29, 2011

(54) SECURE DATA DISPOSAL FOR DISK DRIVE

(75) Inventors: Daryl Carvis Cromer, Cary, NC (US); Howard Jeffrey Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 12/902,380

(22) Filed: Oct. 12, 2010

(65) Prior Publication Data

US 2011/0026157 A1 Feb. 3, 2011

Related U.S. Application Data

(63) Continuation of application No. 12/028,114, filed on Feb. 8, 2008, now Pat. No. 7,894,153.

(51) Int. Cl.
*G11B 5/03* (2006.01)
(52) U.S. Cl. ......................................... 360/66
(58) Field of Classification Search .................... None
See application file for complete search history.

(56) References Cited

U.S. PATENT DOCUMENTS 5,265,082 A * 11/1993 Gniewek et al. ........... 369/53.45

\* cited by examiner

*Primary Examiner* — Daniell L Negron
*Assistant Examiner* — Regina N Holder
(74) *Attorney, Agent, or Firm* — John L. Rogitz

(57) ABSTRACT

When a disk sector is written to, a bit for the sector is set indicating that the sector will require secure data disposal (SDD) to be run on it. To save time during end of life disposal, SDD is executed only on sectors whose bits indicate that they have been written to. SDD can be executed on each dirty sector in one operation at end of life or incrementally during use as disk activity permits.

16 Claims, 1 Drawing Sheet

SECURE DATA DISPOSAL FOR DISK DRIVE

This is a continuation of and claims priority from U.S. patent application Ser. No. 12/028,114, filed Feb. 8, 2008.

FIELD OF THE INVENTION

The present invention relates generally to secure data disposal (SDD) for disk drives.

BACKGROUND OF THE INVENTION

During the retirement phase of the PC life cycle, many users dispose of PCs without properly removing confidential data. This is a serious concern, since the information on these hard disks can then be retrieved by unauthorized people.

Many users think that formatting a hard disk removes and destroys its data, when in fact this data, which can be highly confidential, can still be retrieved from these systems. With most operating systems, files that are deleted are not necessarily erased. In many cases, the only thing erased is the logical link to the file.

SUMMARY OF THE INVENTION

To ensure that data cannot be retrieved even if a disk is removed from the drive and residual magnetic fields read by sophisticated data thieves, SDD is executed only on data regions that have been written to at least once during the lifetime of a disk drive, in some hard disk drive implementations up to fourteen overwrite cycles maybe conducted as part of the SDD to ensure that any residual magnetic fields from the original data write are effectively eliminated, but as understood herein, absent present principles over twenty four hours may be required for such a comprehensive and repetitive overwrite process.

A method is disclosed for secure data disposal (SDD) of a disk drive having at least one data storage disk defining data regions. The method includes, for each data region to which data is written, indicating that the data region has been written to. The method then includes executing SDD only of data regions indicated to have been written to, and not executing SDD in data regions that have never been written to.

SDD may be executed only at end of life of the disk drive but only on all data regions indicated as having been written to at least once. Alternatively, SDD may be executed during operational life of the disk drive, e.g., on a previously written data region immediately after the previously written data region is indicated as being a free data region, or on a previously written data region during an idle period of the drive subsequent to an indication that the previously written data region is a free data region.

In one example, the data region can be a disk sector and the SDD includes writing a first pattern into substantially all bit locations of a sector, then writing at least a second pattern different from the first pattern into substantially all bit locations of the same sector. For sonic hard disk drive applications up to fourteen patterns may be written one on top of the other.

In another aspect, a tangible computer readable medium bears instructions to cause a processor, when a data storage disk sector is written to, to set a bit for the sector indicating that the sector will require secure data disposal (SDD) to be run on it. The processor executes SDD only on sectors whose bits indicate that they have been written to.

In another aspect, a disk drive includes one or more data storage disks and a processor writing data to sectors of the disk. A tangible program storage device bears instructions to cause the processor, pursuant to writing data to a sector, to set an indicator bit associated with the sector indicating that data has been written thereto. The instructions also cause the processor to execute secure data disposal (SDD) only on sectors whose respective indicator bits indicate the sectors have been written to.

In another aspect, a disk drive includes one or more data storage disks and a processor writing data to sectors of the disk. A tangible program storage device hears instructions to cause the processor, pursuant to writing data to a sector, determine whether another sector has been designated as being a free sector as a result. The instructions cause the processor to execute secure data disposal (SDD) only on the free sector.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
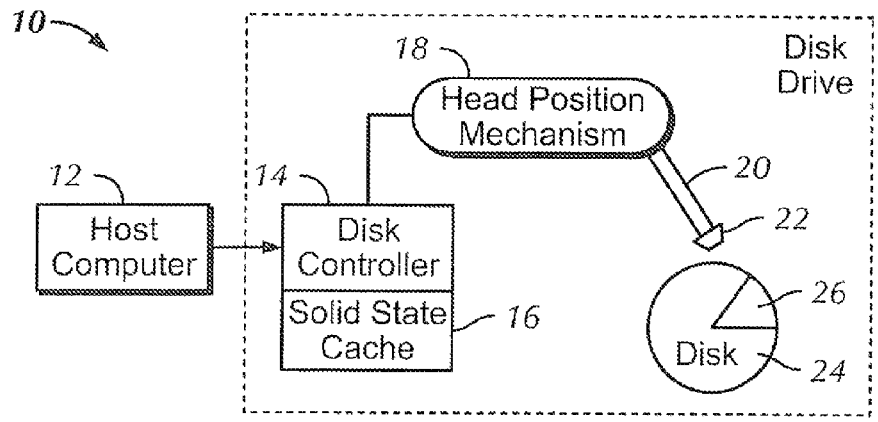
FIG. 1 is a block diagram of one non-limiting system in accordance with present principles.

Referring initially to FIG. 1, a disk drive 10 such as, in one example, a hard disk drive can be used by a host computer 12 such as a notebook computer or desk top computer or any device that uses a disk drive to store data. The disk drive 10 typically includes a drive controller 14 that can be implemented by a processor. The disk drive 10 also includes a tangible computer readable medium such as but not limited to a solid state data cache 16 that, among other things, can store logic disclosed herein. The logic is executable by the drive controller 14 or other processor in the disk drive 10.

The controller 14 can also control one or more head position mechanisms 18 that move one or more suspensions 20 bearing read and write heads 22. The heads 22 read information from and write information to one or more rotatable data storage disks 24. Typically, data is written to discrete areas of the disk 24 referred to herein as "sectors" 26, it being understood that "sector" is not limited to a particular geometry such as a ring or wedge but more generally refers to a portion of the disk 24 that is regarded as a discrete storage area unit for purposes of secure data disposal (SDD).

SDD typically involves writing plural unique patterns of "ones" and "zeroes" into each sector of the disk, one pattern on top of another. More specifically, a first pattern is written into substantially all bit locations of a sector, then at least a second pattern different from the first is written into substantially all bit locations of the same sector to effect SDD. Additional patterns may be overwritten on top of the first two if desired. This is true of hard disk drives and other storages that rely on magnetic principles to store data. In the case of optical drives, flash memory, and other true digital devices, only one overwrite pattern may be required.

Figure 2:
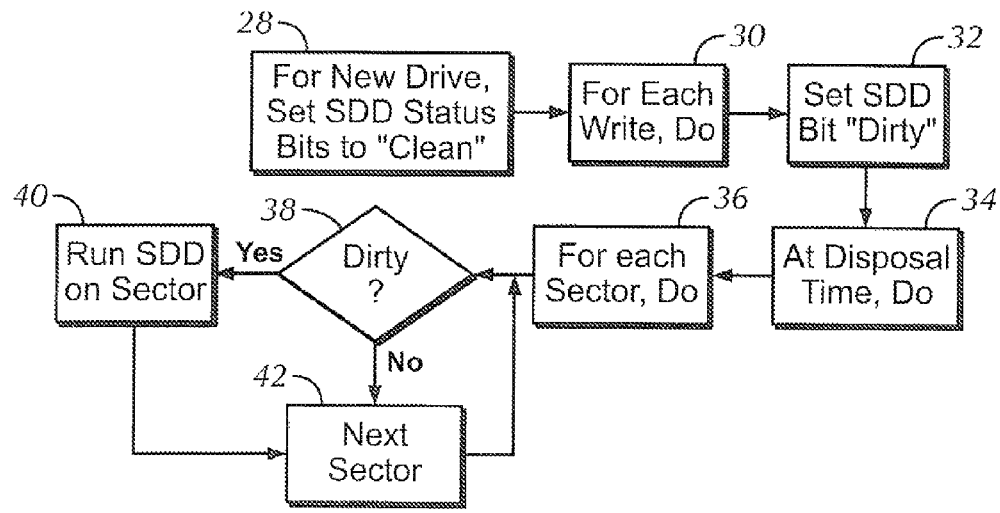
FIG. 2 is a flow chart of one example logic that may be employed in accordance with present principles.

FIG. 2 shows one embodiment of logic that may be implemented in accordance with present principles. Commencing at block 28, for each new drive, each sector is designated as "clean", i.e., as never having been written. This designation may be accomplished by establishing the value of an indicator bit, referred to herein for convenience as a SDD bit, as appropriate, e.g., to be "zero" for "clean" and "one" for "dirty". The SDD bit for sector may reside in the sector or it may reside elsewhere, e.g., in a SDD bit table stored in the cache 16.

The drive is then sold for use and subsequently during its operational lifetime, at block 30 for each write to a sector the SDD bit of the sector is set to a value indicating "dirty" at block 32. At the end of the operational life of the disk drive when it is intended to be securely disposed of at block 34, for each sector at block 36 it is determined at decision diamond 38 whether the respective SDD bit indicates that the sector is dirty. If it does, SDD is executed on the sector at block 40, and upon completion of SDD the next sector is retrieved for test at block 42, with the logic looping back to decision diamond 38 to test the SDD bit of the next sector. On the other hand, if the test at decision diamond 38 is negative, SDD is not executed on the sector, and the logic proceeds immediately to block 42. In this way, SDD is performed only on sectors requiring it, saving execution time.

Figure 3:
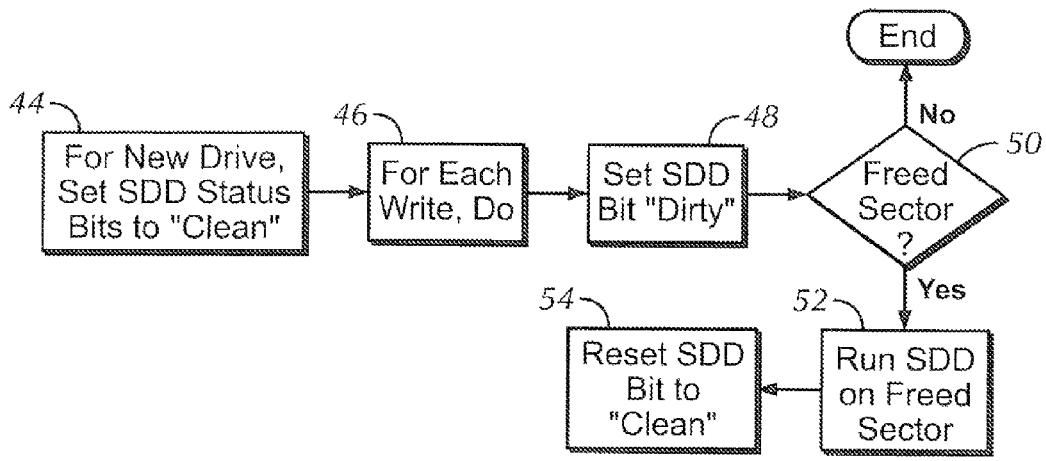
FIG. 3 is a flow chart of another example logic; that may be employed in accordance with present principles.

An alternate implementation is shown in FIG. 3. Commencing at block 44, for each new drive, each sector is designated as "clean", i.e., as never having been written. This designation may be accomplished by establishing the value of an indicator bit, referred to herein for convenience as a SDD bit, as appropriate, e.g to be "zero" for "clean" and "one" for "dirty", The SDD bit for a sector may reside in the sector or it may reside elsewhere, e.g., in a SDD bit table stored in the cache 16.

The drive is then sold for use and subsequently during its operational lifetime, at block 46 for each write to a sector the SDD bit of the sector is set to a value indicating "dirty" at block 48. However, unlike the logic of FIG. 2, the logic of FIG. 3 implements SDD during the operational life of the disk to further reduce the amount of time required at end of life to secure the disk.

Specifically, when a write is executed, a previously written sector might be designated as being "free" as a result when, for instance, data in the previously written sector is updated but owing to space constraints the updated version, is written into another sector. When this occurs at decision diamond 50, SDD is executed on the newly freed sector at block 52 and the SDD bit reset to "clean" at block 54. SDD may be executed on the free sector immediately after the free sector is indicated as being a free sector, or SDD can be executed on the free sector during the next subsequent idle period of the drive after the free sector has been designated as such.

While the particular SECURE DATA DISPOSAL FOR DISK DRIVE is herein shown and described in detail, it is to be understood that the subject matter which is encompassed by the present invention is limited only by the claims.

What is claimed is:

1. A method for secure data disposal (SDD) of a disk drive having at least one data storage disk defining data regions, comprising:
   pursuant to writing data to a data region, determining whether another data region has been designated as being a free data region as a result; and
   executing SDD only on the free data region, wherein the SDD includes writing a first pattern into substantially all bit locations of a data region.

2. The method of claim 1, wherein the act of executing is undertaken only at end of life of the disk drive only on all data regions written to at least once.

3. The method of claim 1, wherein the disk drive is a hard disk drive.

4. The method of claim 1, wherein the act of executing is undertaken during operational life of the disk drive.

5. The method of claim 4, wherein the act of executing is undertaken on a previously written data region immediately after the previously written data region is indicated as being a free data region.

6. The method of claim 4, wherein the act of executing is undertaken on a previously written data region during an idle period of the drive subsequent to an indication that the previously written data region is a free data region.

7. The method of claim 1, wherein the act of executing SDD includes:
   writing at least a second pattern different from the first pattern into substantially all bit locations of the same data region after writing the first pattern into substantially all bit locations of the data region.

8. A tangible computer readable medium bearing instructions to cause a processor to execute logic comprising:
   when a data region of a storage device is written to, setting a bit for the data region indicating that the data region will require secure data disposal (SDD) to be run on it; and
   executing SDD on all bit locations only on data regions whose bits indicate that they have been written to, the bit for the data region indicating that the data region will require SDD residing in the region to which it pertains.

9. The tangible computer readable medium of claim 8, wherein the logic comprises:
   executing SDD on each dirty data region in one operation at end of life.

10. The tangible computer readable medium of claim 8, wherein the logic comprises:
    executing SDD on each dirty data region incrementally during use as disk activity permits.

11. The tangible computer readable medium of claim 8, wherein the disk is part of a hard disk drive.

12. The tangible computer readable medium of claim 8, wherein the act of executing SDD includes:
    writing a first pattern into substantially all bit locations of a data region; then
    writing at least a second pattern different from the first pattern into substantially all bit locations of the same data region.

13. A data storage device, comprising:
    at least one data storage medium;
    at least one processor writing data to one or more data regions of the medium; and
    a tangible program storage device bearing instructions executable by the processor to:
    pursuant to writing data to a data region, set an indicator bit associated with the data region indicating that data has been written thereto;
    execute secure data disposal (SDD) on all bit locations only on data regions whose respective individual indicator bits indicate the data regions have been written to, the individual indicator bits residing in the regions to which they respectively pertain.

14. The device of claim 13, wherein SDD is executed on a previously written data region immediately after the previously written data region is indicated as being a free data region.

15. The device of claim 13, wherein SDD is executed on a previously written data region during an idle period of the drive subsequent to indicating that the previously written data region is a free data region.

16. The device of claim 13, wherein the SDD includes:
    writing a first pattern into substantially all bit locations of a data region; then
    writing at least a second pattern different from the first pattern into substantially all bit locations of the same data region.

* * * * *